May 11, 1937. K. J. R. ROBERTSON Re. 20,359

METHOD AND APPARATUS FOR CLEANING ARTICLES, PARTICULARLY METALLIC GOODS

Original Filed Aug. 25, 1928

INVENTOR.
KENNETH JAMES RENNIE ROBERTSON
BY
E. N. O'Brien
ATTORNEY

Reissued May 11, 1937

Re. 20,359

UNITED STATES PATENT OFFICE 20,359

METHOD AND APPARATUS FOR CLEANING ARTICLES, PARTICULARLY METALLIC GOODS

Kenneth James Rennie Robertson, London, England, assignor, by mesne assignments, to E. I. du Pont de Nemours & Company, Wilmington, Del., a corporation of Delaware Original No. 1,905,968, dated April 25, 1933, Serial No. 302,038, August 25, 1928. Application for reissue June 15, 1936, Serial No. 85,442. In Great Britain June 13, 1928

16 Claims. (Cl. 87—6)

Figure 1:
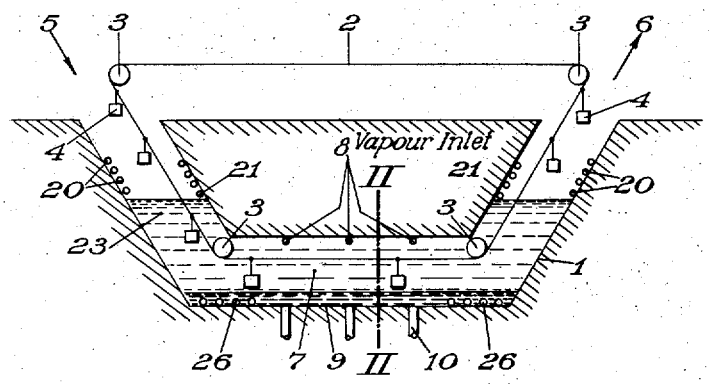

This invention relates to methods and apparatus for cleaning articles, particularly metallic goods.

The main object of the present invention is to provide a method and apparatus for cleaning articles, more especially metal articles and castings, wherein the whole surface of the articles will be subjected to solvent action, preferably combined with a scrubbing or washing movement, and a second object is to provide a cleaning plant from which the articles emerge in a dry condition.

A further object is to provide for the continuous use of a comparatively small body of solvent by re-circulating the solvent through the cleaning plant and extracting any dissolved grease and dirt after its contact with the dirty articles, whereby a supply of clean vapor to the plant is obtained.

A still further object is to prevent losses of the highly volatile solvents employed by leakage to atmosphere and thereby render operation of plant according to the invention economical.

In accordance with the present invention a method of cleaning greasy or oily articles consists in immersing them or moving them into a body of solvent vapor and allowing the article to remain in the vapor until a quantity of solvent vapor has been condensed upon the article sufficient to remove the oil and grease therefrom. In order to effect the condensation, the article should, of course, be substantially colder than the solvent vapor so that the desired amount of condensation of the vapor will take place. Moreover, after the oil and grease have been thus removed by the condensation of vapor, the article should be again moved out of the vapor bath into the atmosphere, so as to avoid contacting the article with any liquid containing oil or grease.

To obtain continuous cleaning the articles are preferably traversed through a bath of the vapor solvent, the grease charged condensate of which is regenerated and resupplied to the bath as clean vapor after extraction of the grease, and the bath is thus maintained charged with the clean vapor solvent necessary for effective cleaning of the articles.

The solvents used are preferably those whose vapors are heavier than air and such as will readily remove grease, wax or oils from metallic goods without any chemical effect on those goods, and the employment of such vapors permits of an open trough or chamber being used, the vapor lying near the bottom of the trough or chamber, and to a predetermined height controlled by the admission of vapor, and if desired also by refrigerating means located in the upper zones of the trough or chamber which cause any vapor rising to their vicinity to condense and fall to the base of the chamber.

Preferred apparatus for cleaning greasy articles according to the invention, includes a bath of vapor solvent, a conveyor traversing articles through such bath, and regenerating stills extracting the grease charged condensate from the bath, regenerating and maintaining the bath charged with clean vapor through inlets connecting the bath with the stills.

Preferably the inlets are disposed so as to produce a circulating movement of the vapor in the nature of a convection current, and in addition such inlets are preferably duplicated or multiplied, each set of inlets having an associated regenerating apparatus so that one apparatus may be disconnected and cleaned by the ejection of accumulated grease and dirt, while the other supplies the bath with the regenerated clean vapor.

At the bottom of the bath outlets are provided for collecting the condensation products and these outlets are connected to regenerating apparatus for reforming the vapor from the condensation products, the regenerators being preferably directly connected to the vapor inlets to the trough to form a closed cycle and so that a continuous supply of vapor is assured.

A cleaning plant according to the invention may be automatically controlled by thermostats associated, for instance, with the heaters of the regenerating apparatus so that their operation is regulated according to the temperature of the vapor in the bath, or according to the depth of the vapor in the bath, that is to say, that thermostats may be disposed just above the vapor bath so that when the warm vapor reaches the thermostats the regeneration is cut down. Such an arrangement may be utilized in conjunction with the refrigerating zones aforesaid or alternative thereto.

Figure 2:
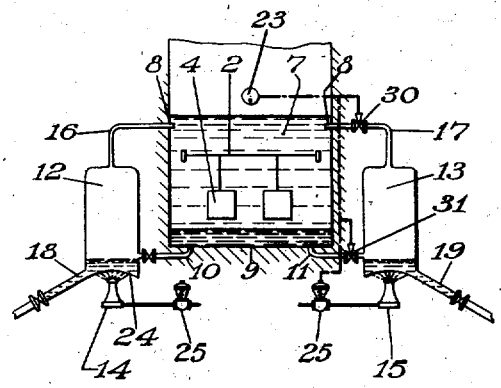

The invention will be further described with reference to the accompanying sheet of explanatory drawings which illustrates diagrammatically by way of example a preferred form of apparatus for carrying the invention into effect, and in which:

Fig. 1 is a transverse section of the apparatus showing the conveyor feed for the articles to be cleaned and the disposition of the vapor inlets with regard thereto; and Fig. 2 is a section on the line II—II of Fig. 1 showing the vapor circuit and the relative arrangement of the cleaning section of the conveyor.

Referring now to the drawing 1 is a bath in the form of a U-shaped duct in which is disposed a conveyor 2 mounted on feed rollers 3 and preferably adapted for the continuous feeding of a succession of the articles 4 to be cleaned, which are shown suspended from the conveyor 2 and which—dependent on the form of the article—may either be carried in baskets mounted on the conveyor or suspended direct therefrom by means of hooks. The articles 4 are preferably at normal or room temperature.

In the example illustrated the conveyor 2 is moving in a counterclockwise direction and the articles 4 about to be cleaned enter the bath at 5 and are discharged at 6 after passage through the cleaning zone 7 of the bath 1 cleansed as required by the removal of any grease or dirt which adhered to their surfaces.

8 represents vapor inlet nozzles to the cleaning zone 7, which are disposed in the vicinity of the feed conveyor 2 and the vapor—at a somewhat elevated temperature—issuing from the inlets 8 impinges on the greasy articles 4 to be cleansed, which, due to their lower temperature cause condensation of the vapor on their surfaces, this condensate after dissolving the superficial grease and dirt carried by the articles 4 falling to the bottom 9 of the bath 1 from whence it is withdrawn through waste pipes such as 10 and 11 and regenerated as desired.

The vapor circuit is illustrated in Fig. 2 and it will be seen that the waste pipes 10 and 11 communicate with stills 12 and 13 respectively in which the condensed vapor is regenerated by being boiled under the influence of sources of heat 14 and 15 disposed in association with each of the stills 12 and 13, the regenerated vapor passing through conduits 16 and 17 and the nozzles 8 to the cleaning zone 7 and the collected grease and dirt being discharged from the bottom of the stills 12 and 13—say at intervals— through conduits 18 and 19 provided with suitable valves or taps adapted to regulate the discharge.

As has already been mentioned the vapors utilized in the bath 1 are preferably those heavier than air, and such as will readily remove grease, wax or oils from metallic goods without having any chemical effect on the goods, but even with heavier than air vapors, an excessive regeneration from the stills 12 and 13 taking place, a certain proportion of the vapor in the bath 1 would leak to atmosphere unless special provision were made for its prevention. Accordingly in the upper zones of the bath 1 a series of cooling pipes 20 are disposed around the inner surface of the bath 1 through which pipes refrigerant is preferably conveyed, so that on the vapor reaching the upper zones of the bath, that is in the vicinity of the cooling pipes 20, condensation is effected and the vapor falls to the base 9 of the bath and is conveyed through the waste pipes 10, 11, to one or other of the regenerating stills 12 and 13.

Where desired, control of the regeneration in the stills 12, 13, may be effected by means of a thermostat such as 23, which may, if desired, replace the series of cooling pipes 20, or may be used in addition thereto, such thermostat 23 being arranged so that when subjected to the influence of the warm vapor it operates to close one of the waste pipes such as 11 and a vapor supply pipe such as 17 by valves 31 and 30 and simultaneously cut off the supply of heat to the corresponding still 13 by the closing of valve 25, so that the condensate is removed from the bath only through the waste pipe 10 and regeneration only continued in the still 12 until desired conditions are restored, when the thermostat 23 will reopen the waste pipe 11, the vapor supply pipe 17, and simultaneously supply heat to the still 13, thereby commencing regeneration of the vapor therein.

The thermostat 23 is preferably disposed somewhat above the cleaning zone 7, say in the entry 5 or the exit 6, and remote from the influence of the cooling pipes 20, providing a refrigerating zone therefor.

A particular form of still utilized is illustrated in Fig. 2 of the drawing and is provided with a convex base 24 below which is disposed a suitable source of heat for example, a gas burner 14 or 15, the supply of gas to which may be under control from the thermostat 23 by means of a diaphragm valve 25, and the still being provided with a discharge conduit such as 18 or 19 for the collected grease and dirt.

In operation and using as the cleansing medium or solvent, say dichlorethylene having a boiling point in the neighborhood of 125° F., the stills are arranged to deliver the vapor through the inlets 8 at a temperature of say 120° F. and the articles to be cleaned possessing a normal temperature of say 60° F. are fed to the conveyor 2 at 5 and conveyed into the cleaning zone 7, where, by reason of their relative coldness, condensation of the solvent vapor is effected on their surfaces, whereby the grease and dirt coating is dissolved off in solution which—as liquid—falls to the base 9 of the bath and passes through the waste pipes 10 and 11 to the stills 12 and 13 and the articles are dried by the heat from the condensing vapor.

Regeneration is effected in the stills under control of the thermostat 23, the regenerated vapor being supplied in the cleaning zone 7 through the vapor inlets 8 and the residue grease and dirt remaining in the base of the stills 12 and 13 from whence it is collected as required.

Where desired, the conveyor 2 may be arranged so that the articles 4 after cleaning are passed through a chamber in which hot air is circulated, in order to remove the last traces of solvent, or alternatively a separate conveyor may be used for this purpose.

An alternative method of regenerating the vapor and simultaneously separating the collected grease and dirt is illustrated in the dotted lines in Fig. 1 where—in the base 9 of the bath 1—are shown a series of heating pipes 26 through which may be passed steam or other media adapted to maintain the pipes at a temperature sufficient to effect vaporization of any condensed liquid falling in their vicinity, such temperature depending on the particular vapor or solvent used, and being conveniently controlled by suitable thermostats.

It may be found preferable to arrange the series of refrigerant cooling pipes 20, so that they are hingedly secured to permit of the opening of the bath to atmosphere at the entry 5 and the exit 6 being suitably regulated, while although the apparatus shown includes two stills 12 and 13 for regenerating the vapor, more of these stills may be provided if desired, each preferably under thermostatic control, so that individual stills may be dismantled or cleaned while the apparatus remains in operation.

The method of and apparatus for cleaning articles according to the invention assures complete removal of all grease from the articles, which, traversing the vapor in a direction at right angles to its movement, are moved in a manner equivalent to agitating the articles in the vapor, complete subjection of the articles to the vapor being thus ensured.

By ensuring that the articles entering the bath are in a relatively cold condition while the vapor is at a moderately high temperature the heat liberated by the solvent condensing on the surfaces of the articles raises their temperature, thus softening any grease on their surfaces and rendering it more easily soluble whilst evaporation of any condensed solvent is ensured prior to the articles leaving the bath so that they issue in a cleaned dry condition.

Further the vapor treatment according to the invention permits of the vapor penetrating to the surface of the articles to be cleaned prior to its condensation, thereby effecting an exceptionally rigorous detergent effect with consequent complete removal of any grease and dirt from their surfaces.

Although the invention has been described with more particular reference to the treatment of metallic articles, it should be understood that it is also applicable to the cleaning of fabrics, garments, wool and other similar materials.

In view of the description of the invention, it will be apparent that an important advantage of the invention consists in the simplicity of the operation whereby the object to be cleaned is moved into the solvent vapor bath through the open atmosphere without having to attend to the removal of covers of apparatus and without having to wait for the solvent to be generated. The bath of solvent vapor is continuously maintained and the objects to be cleaned are directly moved into it through the open atmosphere, and allowed to remain until enough solvent has condensed to remove the oil and grease, and then the objects are directly moved out again through the open atmosphere. The simplicity and ease of operation are characteristic of this invention. The objects are not left with a film of oil or grease which would occur if they were directly immersed into a body of cleaning liquid.

What I claim is:

1. A method of removing oil and grease from an object which consists in generating a solvent vapor, collecting said solvent vapor in a container open to the atmosphere, moving said object into said solvent vapor bath, allowing the object to remain in said solvent vapor bath until sufficient solvent vapor has been condensed thereon by reason of the difference in temperature between said object and said vapor to remove the oil and grease therefrom, and thereupon moving said object out of said vapor bath.

2. A method of removing oil and grease from an object which consists in generating a solvent vapor, collecting said solvent vapor in a container open to the atmosphere, moving said object into said solvent vapor bath, and allowing said object to remain in said bath as long as there is a substantial difference in temperature between said bath and said object, whereby solvent vapor is condensed on said object and the oil and grease removed thereby.

3. A method of removing oil and grease from an object which consists in generating a solvent vapor, collecting said solvent vapor in a container open to the atmosphere, moving said object into said solvent vapor bath, allowing said object to remain in said bath until sufficient solvent vapor has been condensed thereon by reason of the difference in temperature between said object and said vapor to remove the oil and grease therefrom, and thereupon moving said object out of said vapor bath into the atmosphere.

4. A method of removing oil and grease from the surfaces of an object which consists in generating a solvent vapor, collecting said solvent vapor in a container open to the atmosphere, moving said object into said solvent vapor bath, said solvent vapor bath being maintained within a fixed space, allowing said object to remain in the bath until sufficient solvent vapor has been condensed thereon by reason of the difference in temperature between said object and said vapor to remove the oil and grease therefrom, and thereupon moving said object out of said vapor bath.

5. A method of removing oil and grease from an object which consists in generating a solvent vapor, collecting said solvent vapor in a container open to the atmosphere, moving said object from the open atmosphere into said solvent vapor bath, allowing said object to remain in said bath until sufficient solvent vapor has been condensed thereon by reason of the difference in temperature between said object and said vapor to remove the oil and grease therefrom, and thereupon moving said object out of said vapor bath and into the atmosphere.

6. A method of removing oil and grease from an object, consisting in boiling a grease solvent in a vessel open to the atmosphere so that a volume of solvent vapor is maintained in the vessel, condensing vapors at the open top of the vessel to prevent their escape, moving the said object into the vapor and allowing it to remain there until the oil and grease have been removed by the condensation of the solvent, and then moving the object out of the vapor into the atmosphere again.

7. A method of removing oil and grease from an object, consisting in boiling a grease solvent whose vapors are heavier than the atmosphere, in a vessel open to the atmosphere, so that a volume of solvent vapor is maintained in the vessel, condensing vapors at the open top of the vessel to prevent their escape, moving the said object into the vapor and allowing it to remain there until the oil and grease have been removed by the condensation of the solvent, and then moving the object out of the vapor into the atmosphere again.

8. A degreasing apparatus comprising a vapor chamber having inlet and outlet openings toward the top thereof, a grease solvent liquid tank, means for heating said tank to vaporize liquid solvent contained therein, a vapor conduit connecting said tank with said chamber, cooling coils arranged at the upper part of said chamber for condensing the vapor therein, a drain pipe connecting said chamber with said tank and a conveyor arranged to carry articles through said chamber and expose them to the condensing vaporous solvent.

9. A degreasing apparatus comprising a vapor chamber having ends upwardly inclined to form inlet and outlet passages, vapor condensing coils arranged in said chamber at the ceiling thereof, a pair of grease solvent liquid tanks, means for heating either of said tanks, a vapor conduit connecting each of said tanks with said chamber, closure means in each of said conduits, a liquid drain from said chamber to each of said tanks, closure means in each of said drains, and an endless chain conveyor arranged to pass along said chamber through the inlet and outlet opening passages.

10. A combination of apparatus for cleaning greasy articles comprising a trough having an inlet and an outlet open to the atmosphere, cooling means in combination with the trough adjacent said inlet and outlet, the body of the trough being arranged at a level below said inlet and outlet, an endless conveyor entering the trough from a level above said inlet and adapted to convey articles through the trough, a still for producing solvent vapors, means for feeding vapors from the still within the trough above the line of travel of the conveyor and means for removing grease and dirt from the bottom of the trough, said inlet and outlet being arranged with respect to the body of the trough so that vapor heavier than air will be retained in the body of the trough, wholly covering the portion of the conveyor therewithin, and have its upper level below the inlet and outlet openings.

11. Apparatus for cleaning articles comprising a trough substantially U shaped in form, the body of the trough being the lowermost portion of the U, means for vaporizing a liquid solvent, nozzles for discharging the vapor in the upper portion of the body of the trough, means for returning grease laden solven to said vaporizing means, means for withdrawing grease and residue from the bottom of the body of the trough and returning the same to said vaporizing means and conveying means traversing the body of the trough, said conveying means being adapted to carry articles to be degreased within the trough and remove them from the trough through an inlet and an outlet open to the atmosphere, cooling means for preventing escape of vapor from the trough to the outer atmosphere, and means for controlling the level of the vapor within the trough.

12. A combination of apparatus for degreasing articles comprising a trough, U-shaped in form, an inlet to and an outlet from said trough open to the atmosphere, cooling means for preventing escape of vapor from the trough to the outer atmosphere, the body of the trough comprising the bottom portion of the U, means for evaporating a liquid solvent externally of said trough, a nozzle leading from said means to the upper portion of the body of the trough, a drain from the bottom of the body of the trough leading to said means, and means for lowering articles within the trough and withdrawing them therefrom.

13. A combination of apparatus of the character described comprising a trough having an inlet and an outlet open to the atmosphere and at a level above the body of the trough means for producing solvent vapors externally of the trough, nozzles for feeding vapors from said means within and at the uppermost portion of the body of the trough, cooling means for preventing escape of vapors to the outer atmosphere and a conveyor for carrying articles to be degreased traversing the body of the trough beneath said nozzles.

14. A degreasing system having a trough at a certain level, an inlet to and an outlet from said trough open to the atmosphere at a level above the trough, means for generating solvent vapors and feeding it within the trough, means comprising condensing coils to confine the vapors within the trough and above the body thereof but below the inlet and outlet, means for returning used solvent to said vapor generating means, and means for conveying articles to be degreased within the trough.

15. A combination of apparatus of the character described comprising a trough having an inlet and an outlet, means for conveying articles within the trough and removing them therefrom, means comprising a still for generating a vapor adapted to dissolve grease, means for feeding the vapor within the trough, means for removing condensate and residue from the trough to said still for regeneration, said trough having cooling means for preventing escape of vapor through said inlet or outlet, and means for retaining the level of the vapor below the inlet and outlet.

16. A combination of apparatus of the character described having a trough, a vapor generator apart from said trough, an arrangement of nozzles for feeding vapor from the generator to the upper portion of the trough, means for withdrawing liquid and residue from the lower portion of the trough to the generator, one portion of the trough adapted to be completely filled with vapor from top to bottom, the trough having an extension open to the atmosphere, cooling means for confining the vapors to the trough and means for traversing articles to be degreased within the trough between the levels at which vapor is admitted and liquid and residue removed.

KENNETH JAMES RENNIE ROBERTSON.